Patented May 10, 1949

2,469,358

UNITED STATES PATENT OFFICE 2,469,358

PREPARATION OF HYDRAZONITRILES FROM AZINES OF BUTYL KETONES

Witty Lysle Alderson, Jr., and James A. Robertson, Wilmington, Del., assignors to E. I. du Pont de Nemours & Company, Wilmington, Del., a corporation of Delaware No Drawing. Application March 22, 1947, Serial No. 736,586

6 Claims. (Cl. 260—465.5)

1

This invention relates to a process for the preparation of hydrazonitriles.

Hydrazonitrile compounds have been prepared previously by the reaction of an aldehyde or ketone with hydrazine in the presence of a cyanide in an aqueous medium, for example as shown by Thiele and Heuser, Ann., 290, 1-40 (1896) and Hartmann, Chem. Weekblad., vol 23, Jan., 1926, p. 77, Rec. trav. chim., 46, 150 (1927), and Dox. J. Am. Chem. Soc., 47, 1471 (1925). The yields obtained by this process are usually high when water-soluble or low molecular weight ketones such as acetone are used. However, when carbonyl compounds such as methyl butyl ketones or higher ketones which have low solubility in water are employed, the yields of hydrazonitrile are quite low, usually less than 20%. The use of the hydrazonitriles has therefore been impeded by the low yield and consequent cost of preparation.

This invention has as an object the provision of a new process for the preparation of hydrazonitriles, i. e. compounds having both nitrile and hydrazo groups. A further object is the provision of a process for the preparation of hydrazonitriles from ketones and aldehydes of low water solubility and of moderately elevated molecular weight. Another object is the provision of a new process for the preparation of azonitriles. Other objects will appear hereinafter.

These objects are accomplished by the following invention wherein hydrogen cyanide is brought into contact in a system containing not more than 50% water, with the azine of an oxo carbonyl compound (aldehyde or ketone) of not more than twelve carbons and in a preferred modification, with an azine of a ketone which is, apart from the oxo oxygen, hydrocarbon and which is selected from the class consisting of acyclic ketones of six to twelve carbon atoms and acyclic ketones of seven to twelve carbon atoms.

Azine compounds have been prepared previously (A. Mailhe, Bull. soc. chim. (4), 29, 221) from the carbonyl compound, such as methyl isobutyl ketone, and hydrazine hydrate in ethanol. The yield of the azine compound by such a method is high.

The reaction of the azine compound with hydrogen cyanide is readily carried out by treating the azine with hydrogen cyanide conveniently at room temperature or above for a period of time of usually a few hours. The yield of the hydrazonitrile thus obtained may be 90% or more of the theoretical.

The following examples in which the parts given are by weight further illustrate the practice of this invention.

Example I

Methyl isobutyl ketone azine was prepared from methyl isobutyl ketone and hydrazine hydrate by the method described by Mailhe. A total of 300 parts of methyl isobutyl ketone was heated at 90° C. with 75 parts of hydrazine hydrate for six hours. The water formed was separated and the product was distilled under reduced pressure. The azine, which boiled at 98° C. at 12 mm. was obtained in 87% yield. This boiling point corresponded to a temperature of above 215° C. at 760 mm. although Mailhe recorded the boiling point of the azine as 176° C. at 760 mm.

A pressure resistant vessel was charged with 49 parts of methyl isobutyl ketone azine and 45 parts of hydrogen cyanide. The vessel was closed and heated at 100° C. for four hours. After evaporation of the excess hydrogen cyanide under reduced pressure, alpha, alpha'-hydrazobis(alpha,-gamma-dimethylvaleronitrile) remained and was crystallized from petroleum ether. One form precipitated from the ether at 0° C. and was removed by filtration. This form had a melting point of 95° C. An equal amount of an isomeric form was obtained by cooling the filtrate to —56° C. This latter form melted below 30° C. The total yield of both forms was 59 parts or 93% of the theoretical. The mixture had the following analysis: Calculated for $C_{14}H_{28}N_4$, C, 67.2; H, 10.4; N, 22.4. Found, C, 66.6; H, 10.4; N, 22.2. The overall yield of the hydrazonitrile based on the ketone was 81%. When the process of Hartmann was applied to methyl isobutyl ketone, an overall yield of only 24% of the hydrazonitrile was obtained.

The hydrazo compound was oxidized with bromine or chlorine in hydrochloric acid to the corresponding azo compound in approximately quantitative yield. The azo compound obtained by oxidation of the hydrazonitrile had one form which melted at 78° C. and the other at 49–51° C. The azo compound had the following analysis:

Found, C, 68.3; H, 10.2; N, 23.4. Calculated, C, 67.7; H, 9.7; N, 22.6.

When the process of Example I was applied to other oxocarbonyl compounds the following results were obtained:

| Carbonyl Compound | Hydrazonitrile Yield | Hydrazonitrile Melting Point | Azonitrile, Melting Point |
|---|---|---|---|
| | Percent | °C. | |
| Methyl n-butyl ketone | 76 | | 30° C. |
| Methyl isobutyl ketone | 81 (24) | | 78° C., 49-51° C. |
| Methyl n-amyl ketone | 38 | | 43° C. |
| Methyl n-hexyl ketone | 45 | | 30° C. |
| Methyl cyclohexyl ketone | 25 (0) | | 88-95° C. dec. |
| Methyl benzyl ketone | 44 | 142 | 80-82° C. dec. |
| Diisopropyl ketone | 15 (0) | 102-3 | 105-108° C. dec. |
| Di-n-butyl ketone | 9 | | 73° C. |
| Diisobutyl ketone | 9 (0) | | 80° C. dec. |
| 4-Methyl-2-hexanone | 10 | | 35-40° C. |
| Pinacolone | 38 (0) | | 94-96° C. dec. |
| Acetophenone | 64 (0) | 115 | 40° C. dec. |
| Camphor | 20 (0) | 110 | 130-133° C. dec. |

In the above table the percentage figure under "Yield" is the yield obtained when the process of this invention was applied to the particular carbonyl compound. Those figures in parentheses under "Yield" are the yields obtained when the process of Hartmann was applied to the particular oxo compound. The "dec." in the table indicates decomposition at the melting point.

*Example II*

Methyl isobutyl ketone (9 moles, 1125 cc.) was mixed with 3 moles (176.5 g.) of 85% hydrazine hydrate, and distilled through a fractionating column attached to a decanter from which the water layer of the distillate could be removed and the ketone layer returned to the distilling flask. Distillation was continued until the separation of water from the distillate ceased; the total quantity of water recovered was 188 cc. (theory 188.5 g.). The excess ketone was stripped through a fractionating column at 40-45 mm., leaving 559 g. (95% of theoretical) of substantially pure ketazine as still residue.

In stripping the excess ketone from the ketazine, the distillation temperature was brought up to the boiling point of the latter, so that a small quantity of the product passed into the distillate. By recycling the recovered ketone, the over-all yield of ketazine was found to be essentially quantitative.

The still residue was mixed with 11.4 moles (460 cc.) of liquid hydrogen cyanide (96%), cooled in an ice bath to hold the temperature below 30° C., and allowed to stand at room temperature overnight. The solution was poured into ice water to precipitate the resulting hydrazobisisobutyronitrile, which was then washed with additional ice water. The product was suspended in 5 liters of 2 N hydrogen chloride at 0° C. and treated with chlorine at temperatures below 10° C. until completely converted to azobisisobutyronitrile.

The end-point of the oxidation was judged by examining the product. When incompletely oxidized, this was yellowish, greasy to touch, and smelled of hydrogen cyanide. When oxidation was complete, the product was white, free of hydrogen cyanide, and remained solid on the fingertips.

The product was recovered by filtration, washed with cold water, and air-dried at room temperature; the dried product weighed 597 g. (84% of theoretical, based on ketazine) and melted at 58-62° C. with decomposition.

The temperature and time for the reaction of the azine compound with hydrogen cyanide are interdependent variables. Useful temperatures are within the range of 0-100° C. Temperatures above 100° C. are not preferred in view of the fact that hydrogen cyanide undergoes polymerization or decomposition. Temperatures below 0° C. require longer time. Times of from one to twenty-four hours or more are usually employed although the time is not critical. It is preferred that an excess of hydrogen cyanide be employed to insure maximum yield of the resulting hydrazonitrile.

Azine compounds used in the reaction with hydrogen cyanide to give the hydrazonitrile are represented by the formula $(RR'C{=}N{-})_2$ where R is an alkyl, aryl, aralkyl or alicyclic hydrocarbon radical, R' is hydrogen or an alkyl or alicyclic hydrocarbon radical, and R and R' may be joined together to form, with the carbon attached to nitrogen, an alicyclic ring.

While the process of the present invention may be applied to any azine of an oxo or true carbonyl compound of not more than twelve carbons, preferably hydrocarbon except for the oxo oxygen, the process is particularly valuable as applied to azines of those oxo carbonyl compounds which because of considerations such as solubility, steric effect, etc., give little or no yield of hydrazonitrile or azonitrile compounds in the process of Hartmann. These include open chain carbonyl compounds of six to twelve carbons, alicyclic carbonyl compounds of seven to twelve carbons and aromatic carbonyl compounds of seven to twelve carbons. Exemplary carbonyl compounds which may be employed in the process include methyl n-butyl ketone, di-n-butyl ketone, disisobutyl ketone, diisopropyl ketone, methyl cyclohexyl ketone, amyl cyclohexyl ketone, camphor, acetophenone, pinacolone, methyl n-hexyl ketone, butyraldehyde, heptaldehyde and benzaldehyde. The dialkyl ketones are a preferred class and particularly those of six to twelve carbons. The methyl butyl ketones are particularly preferred.

Isolation of the azine prior to reaction with hydrogen cyanide is desirable but is not absolutely essential. The isolation of the azine, however, serves to remove from the reaction zone materials, other than the azine, which are reactive with azines or hydrogen cyanide. It is preferred that the azine be free from unreacted hydrazine and from hydrazones. Hydrazones can be removed by partial distillation. Inert solvents such as dioxane or the alkanols of one to six carbons may be present.

The amount of water present during the reaction of azine with hydrogen cyanide should be not more than 50% based on the weight of hydrogen cyanide. Preferably, the hydrogen cyanide should contain less than 100% water, e. g., the commercial hydrogen cyanide contains less than 5%.

The azine should be reacted with at least two moles, per mole of azine, of hydrogen cyanide. It is preferred that an excess of hydrogen cyanide be employed to give increased yields and in practice from four to six moles of hydrogen cyanide are employed per mole of azine. While greater amounts, even more than ten moles, of hydrogen cyanide may be employed per mole of azine, this is not ordinarily done since economical production of the hydrazonitrile requires recovery of unreacted hydrogen cyanide and too large an excess adds to the difficulties of recovery.

The process of this invention gives rise to one or more of the following advantages: (a) improved yield, (b) improved quality of the product, and (c) increased rate of reaction. The increased yield is particularly noticeable when the ketone has attached to the carbonyl a non-aromatic hydrocarbon radical of at least four carbon atoms.

The hydrazonitriles obtained by the process of this invention may be employed as intermediates in chemical synthesis. A particularly important use is the use as a source material for azonitriles. The hydrazonitriles may be converted to the corresponding azonitrile compounds by mild oxidation. When the hydrazonitrile is to be used as an intermediate for azonitrile production it need not be isolated from the reaction mixture in which it is formed. The hydrazonitrile can be oxidized by bromine or chlorine while stirring an aqueous suspension of the hydrazonitrile, usually in the presence of an acid such as hydrochloric acid. Completeness of the reaction is noted either by analysis or by the fact that the halogen is no longer absorbed. The hydrazonitrile compounds may also be employed as catalysts for addition polymerization reactions for example, polymerization of ethylene or vinyl and vinylidene compounds. The hydrazo compounds are usually effective at much higher temperatures than the corresponding azo compounds.

In the specification and claims the term "azine" is used as in Webster Merriam (definition d) to refer to the condensation product, R=N—N=R, of an oxo carbonyl compound with hydrazine. See also Sidgwick, Organic Chemistry of Nitrogen (1942), page 393. The term "oxo carbonyl compound" is used to designate a carbonyl compound having a "true" carbonyl group (Sidgwick, supra, page 394), i. e., a ketone or aldehyde, as in Classification Bulletin 85, page 9, lines 9–13.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the preparation of hydrazonitriles, the step wherein the azine of a dialkyl ketone, one alkyl of which is butyl and the other alkyl is of 1 to 4 carbons is reacted with hydrogen cyanide by treatment with at least two moles of the latter per mole of ketazine in a reaction system containing not more than 50%, based on the weight of hydrogen cyanide, of water.

2. In the preparation of hydrazonitriles, the step wherein the azine of a dialkyl ketone, one alkyl of which is butyl and the other alkyl is of 1 to 4 carbons is reacted with hydrogen cyanide by treatment with from four to six moles of the latter per mole of ketazine in a reaction system containing not more than 10%, based on the weight of hydrogen cyanide, of water.

3. Process of claim 2, wherein the ketone is an isobutyl ketone.

4. In the preparation of hydrazonitriles, the step wherein the azine of a methyl butyl ketone is reacted with hydrogen cyanide by treatment with at least two moles of the latter per mole of ketazine in a reaction system containing not more than 50%, based on the weight of hydrogen cyanide, of water.

5. In the preparation of hydrazonitriles, the step wherein the azine of a methyl butyl ketone is reacted with hydrogen cyanide by treatment with from four to six moles of the latter per mole of ketazine in a reaction system containing not more than 10%, based on the weight of hydrogen cyanide, of water.

6. In the preparation of hydrazonitriles, the step wherein the azine of methyl isobutyl ketone is reacted with hydrogen cyanide by treatment with from four to six moles of the latter per mole of ketazine in a reaction system containing not more than 10%, based on the weight of hydrogen cyanide, of water.

WITTY LYSLE ALDERSON, JR.
JAMES A. ROBERTSON.

REFERENCES CITED

The following references are of record in the file of this patent:

Thiele et al.; Liebig's Ann., vol. 290, pages 1–40 (1896).

Mailhe: Bull. Soc. Chim. de France (4), vol. 27, pages 541–546 (1920); ibid. vol. 29, pages 221–223 (1921).

Dox: J. Am. Chem. Soc., vol. 47, pages 1471–1477 (1925).

Sannie, Bull. Soc. Chim. de France, vol. 39, pages 254–274 (1926).

Bavid et al.; J. Chem. Soc., vol. 1927, page 2116.

Hartmann; Rec. Trav. Chim., vol. 46, pages 150–153 (1927).

Certificate of Correction

Patent No. 2,469,358.

May 10, 1949.

WITTY LYSLE ALDERSON, Jr., ET AL.

It is hereby certified that errors appear in the printed specification of the above numbered patent requiring correction as follows:

Column 2, line 35, for "59 parts" read *58 parts*; column 4, line 37, for "disisobutyl" read *diisobutyl*; line 60, for "100% water" read *10% water*; column 5, line 37, for "keytone" read *ketone*;

and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*